Patented Dec. 13, 1932

1,891,124

UNITED STATES PATENT OFFICE

ANTON EDUARD VAN ARKEL, JAN HENDRIK DE BOER, AND WILHELMUS KOOPMAN, OF EINDHOVEN, NETHERLANDS, ASSIGNORS TO N. V. PHILIPS' GLOEILAMPEN-FABRIEKEN, OF EINDHOVEN, NETHERLANDS, A LIMITED LIABILITY COMPANY OF THE NETHERLANDS

PROCESS OF PRECIPITATING METALS ON AN INCANDESCENT BODY

No Drawing. Application filed April 29, 1929, Serial No. 359,164, and in the Netherlands June 14, 1928.

This invention relates to a process of precipitating metals on an incandescent body.

According to the invention a body is heated in an atmosphere containing one or more iodides of vanadium. As known, various metals can be precipitated on an incandescent body from the vapour phase of their compounds. One has hitherto not succeeded, however, in finding vanadium a compound which lends itself to the carrying out of this process, for vanadium does not have a suitable compound which is volatile at a low temperature, for example, under 800° C. The upper limit of the temperature of the body at which the latter can be coated with metal precipitated from the vapour phase, which temperature must be higher than the temperature at which the metallic compound volatilizes, is determined, however, by the quickness with which this metal evaporates at the temperature of the body. This made the possibility of finding a vanadium compound suitable for volatilization, decomposition and precipitation on an incandescent body very small. The applicants have found that in spite of these unfavorable conditions it is nevertheless possible to prepare vanadium in a pure and even ductile state by means of precipitation from the vapour phase on an incandescent body by heating the latter in an atmosphere containing one or more iodides of vanadium.

In view of the very high temperatures which are employed in the process according to the invention, it is not possible to use a reaction vessel consisting of glass.

According to the invention, this process is carried out in a vessel consisting, at least partly, of quartz.

The manner in which the process according to the invention can be carried out will hereinafter be described by way of example.

In a vessel made of quartz, is suspended a tungsten wire, which may be led out of the vessel by means of some supply wires and which, therefore, after being connected to a suitable source of current, can be electrically heated. The vessel may be connected by means of a tube to a pumping device which enables to remove the air and any harmful gases that may be produced during the reaction. A certain quantity of vanadium iodide or again iodine and vanadium are introduced into the vessel whereupon the device is heated to such an extent that the vessel becomes filled with volatile vanadium iodide. This temperature must be lower than the temperature at which the said compound decomposes, a suitable value lying between about 800 and 1000° C. At the same time the filament is heated to a temperature lying above the decomposition temperature, for example, to about 1100° C. Now the vanadium iodide passes along the incandescent surface of the wire, owing to which it dissociates. In this case iodine is liberated again in the form of vapour and vanadium settles on the wire. If the atmosphere is free from impurities such as silicon or phosphorus, one obtains in this manner vanadium having a ductile form. It is recommended to start with a metal obtained by precipitation from the iodide on an incandescent body, but it is also possible to take metallic vanadium which has been prepared in any other suitable manner and which has been purified, for example by annealing. This annealing may be effected in the reaction vessel itself, harmful ingredients being expelled at the same time from the wall of the vessel. It is evident that if the incandescent body consists of another metal than vanadium its temperature must not be raised to such an extent that the metal precipitated and material of the incandescent body form an alloy.

What we claim is:

1. A process of producing vanadium in the form of a pure ductile deposit on a solid body enclosed in a vessel, which comprises heating an auxiliary body in an atmosphere containing a dissociable iodide of vanadium to approximately 1100° C., so as to produce a precipitate of vanadium, introducing the said precipitate together with pure iodine into the said vessel, heating the latter so as to form iodide of vanadium and heating to incandescence the said solid body, metallic vanadium being deposited thereby on the incandescent body by dissociating the iodide.

2. The process of producing vanadium in the form of a ductile deposit on a solid body, which comprises heating the said body to approximately 1100° C. in an atmosphere containing a dissociable iodide of vanadium, and simultaneously heating the said iodide of vanadium to a temperature approximately between 800 and 1000° C., the said body being chemically inactive with respect to the said atmosphere.

In testimony whereof we have signed our names to this specification.

ANTON EDUARD van ARKEL.
JAN HENDRIK de BOER.
WILHELMUS KOOPMAN.